United States Patent
Kim et al.

(10) Patent No.: US 11,156,131 B2
(45) Date of Patent: Oct. 26, 2021

(54) EXHAUST GAS COOLING DEVICE AND METHOD

(71) Applicant: DOOSAN HEAVY INDUSTRIES & CONSTRUCTION CO., LTD., Changwon-si (KR)

(72) Inventors: Hyun Sik Kim, Gimpo-si (KR); Jee Hun Park, Gwangmyeong-si (KR); Seung Gyun Cheong, Yongin-si (KR)

(73) Assignee: DOOSAN HEAVY INDUSTRIES & CONSTRUCTION CO., LTD., Gyeongsangnam-do (KR)

( * ) Notice: Subject to any disclaimer, the term of this patent is extended or adjusted under 35 U.S.C. 154(b) by 360 days.

(21) Appl. No.: 16/080,304

(22) PCT Filed: Jul. 26, 2017

(86) PCT No.: PCT/KR2017/008049
§ 371 (c)(1),
(2) Date: Aug. 27, 2018

(87) PCT Pub. No.: WO2018/021823
PCT Pub. Date: Feb. 1, 2018

(65) Prior Publication Data
US 2021/0199024 A1    Jul. 1, 2021

(30) Foreign Application Priority Data
Jul. 28, 2016    (KR) .................. 10-2016-0095836

(51) Int. Cl.
*F01K 23/10*    (2006.01)
*F01K 19/10*    (2006.01)
*F01K 13/02*    (2006.01)

(52) U.S. Cl.
CPC .............. *F01K 19/10* (2013.01); *F01K 13/02* (2013.01); *F01K 23/10* (2013.01); *F01K 23/101* (2013.01);
(Continued)

(58) Field of Classification Search
CPC ........ F01K 23/10; F01K 23/101; F01K 13/02; F01D 19/10; F05D 2260/212;
(Continued)

(56) References Cited

U.S. PATENT DOCUMENTS 3,369,361 A * 2/1968 Craig ...................... F02C 6/006
60/39.5
3,796,045 A * 3/1974 Foster-Pegg ............ F01K 23/10
60/772
(Continued)

FOREIGN PATENT DOCUMENTS

JP    H08-338264 A    12/1996
JP    2000-111001 A    4/2000
(Continued)

*Primary Examiner* — Steven M Sutherland
(74) *Attorney, Agent, or Firm* — Invenstone Patent, LLC

(57) ABSTRACT

The present disclosure relates to an exhaust gas cooling device and method, and more particularly, to a device and method for installing an exhaust gas cooling device on the upper end of a duct of a heat recovery steam generator to cheaply cool the exhaust gas without occupying an additional dedicated area.
An object of the present disclosure is to reduce the costs using a cheap cooling device in the cooling path for cooling the exhaust gas.
In one aspect, the exhaust gas cooling device includes an exhaust gas cooling unit located on the upper end of a duct of a heat recovery steam generator connected with a gas turbine and for cooling the exhaust gas discharged from the gas turbine; and a control unit for controlling the exhaust gas
(Continued)

cooling unit to lower the increase rate of the energy of the exhaust gas flowed into the heat recovery steam generator through the duct.

20 Claims, 8 Drawing Sheets

(52) U.S. Cl.
CPC .... *F05D 2220/72* (2013.01); *F05D 2260/212* (2013.01); *F05D 2260/213* (2013.01); *F05D 2270/303* (2013.01); *F05D 2270/313* (2013.01)

(58) Field of Classification Search
CPC ......... F05D 2260/213; F05D 2260/303; F05D 2260/313
See application file for complete search history.

(56) References Cited

U.S. PATENT DOCUMENTS

| | | | |
|---|---|---|---|
| 2009/0205310 A1* | 8/2009 | Hibshman, II | F02C 6/18 60/39.182 |
| 2016/0376954 A1* | 12/2016 | Davis, Jr. | F01N 3/04 60/301 |

FOREIGN PATENT DOCUMENTS

| | | | |
|---|---|---|---|
| JP | 2012-225179 | A | 11/2012 |
| JP | 2013-064328 | A | 4/2013 |
| JP | 2015-227630 | A | 12/2015 |
| KR | 10-1998-0080487 | A | 11/1998 |
| KR | 20-0315236 | Y1 | 6/2003 |
| KR | 10-0837688 | B1 | 6/2008 |

* cited by examiner

[FIG. 1]
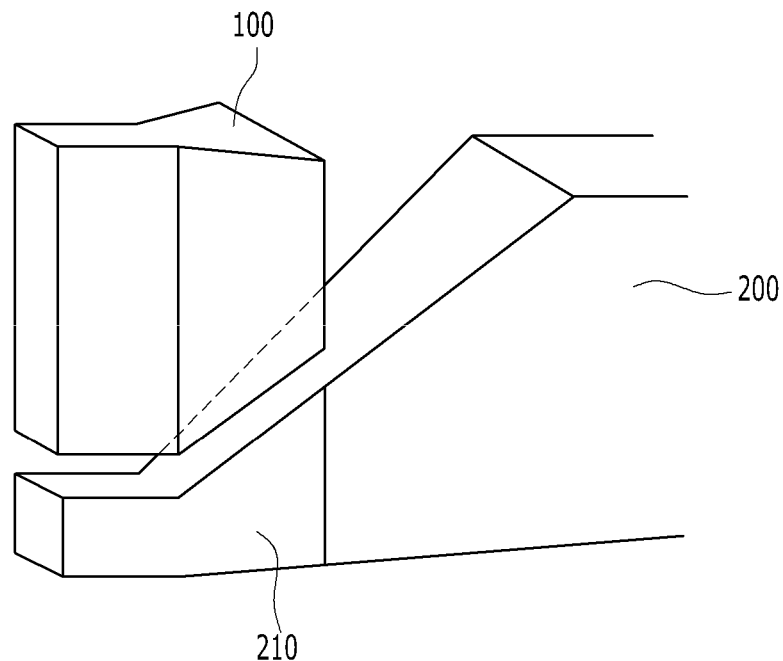

[FIG. 2]
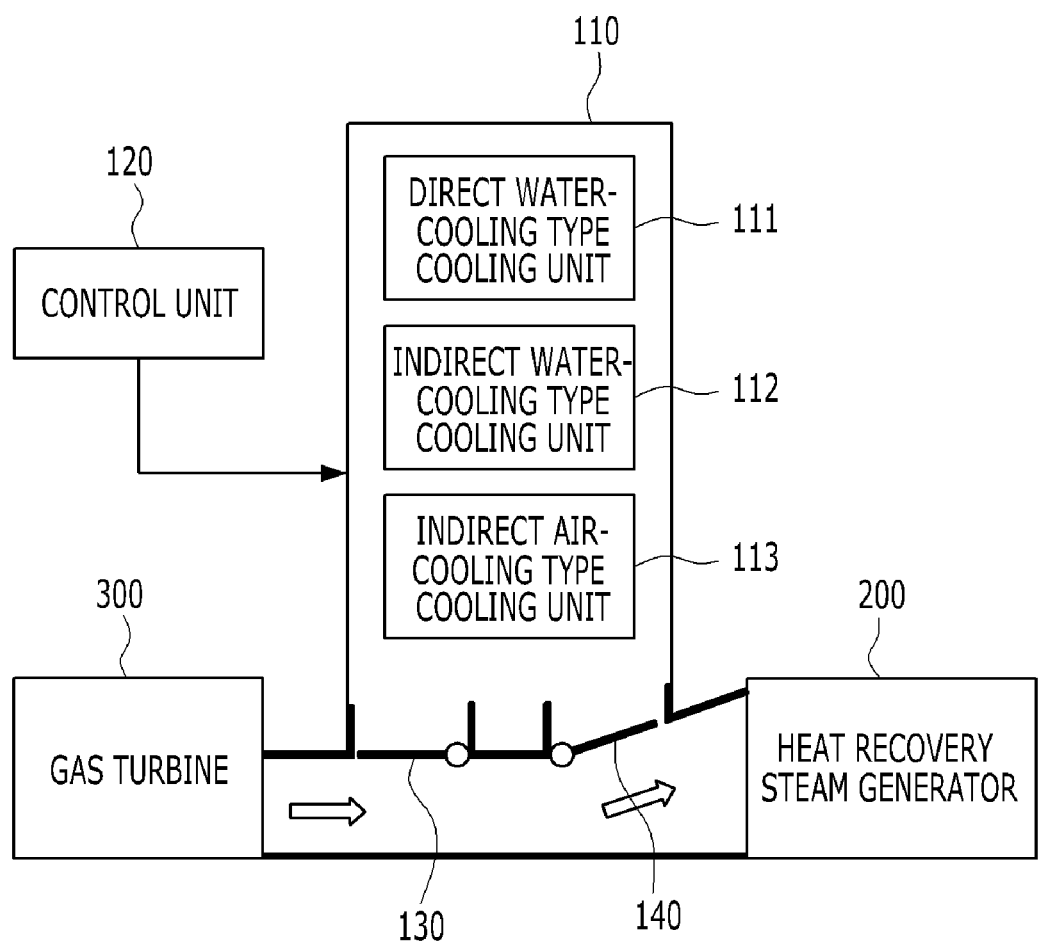

[FIG. 3]
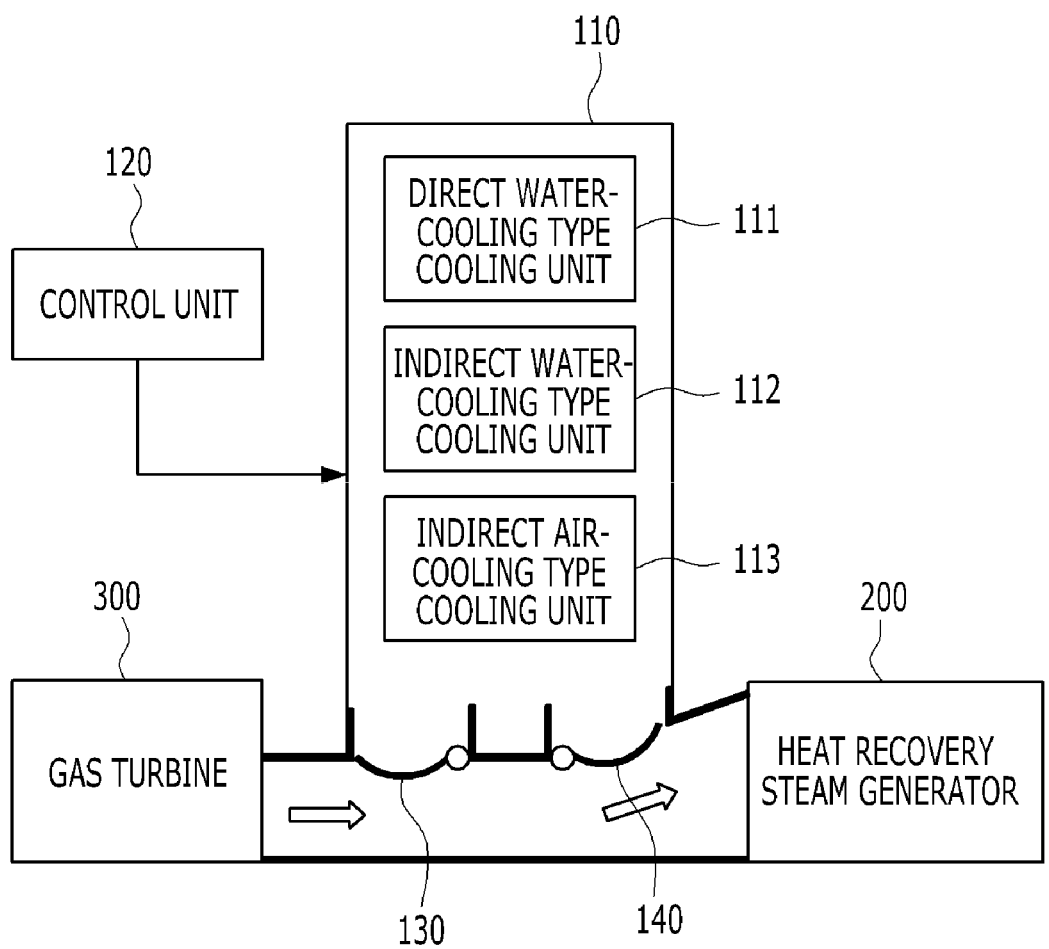

[FIG. 4]
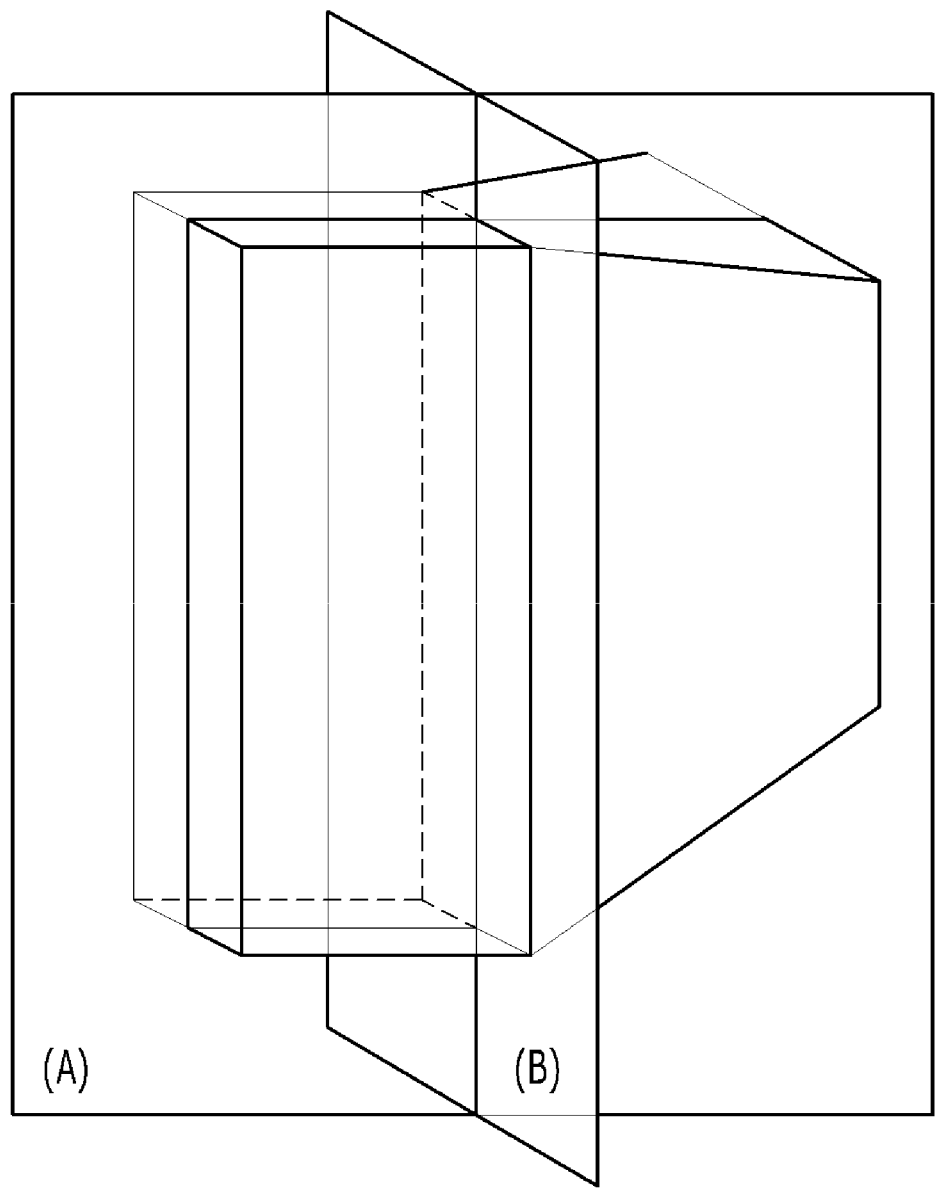

[FIG. 5]
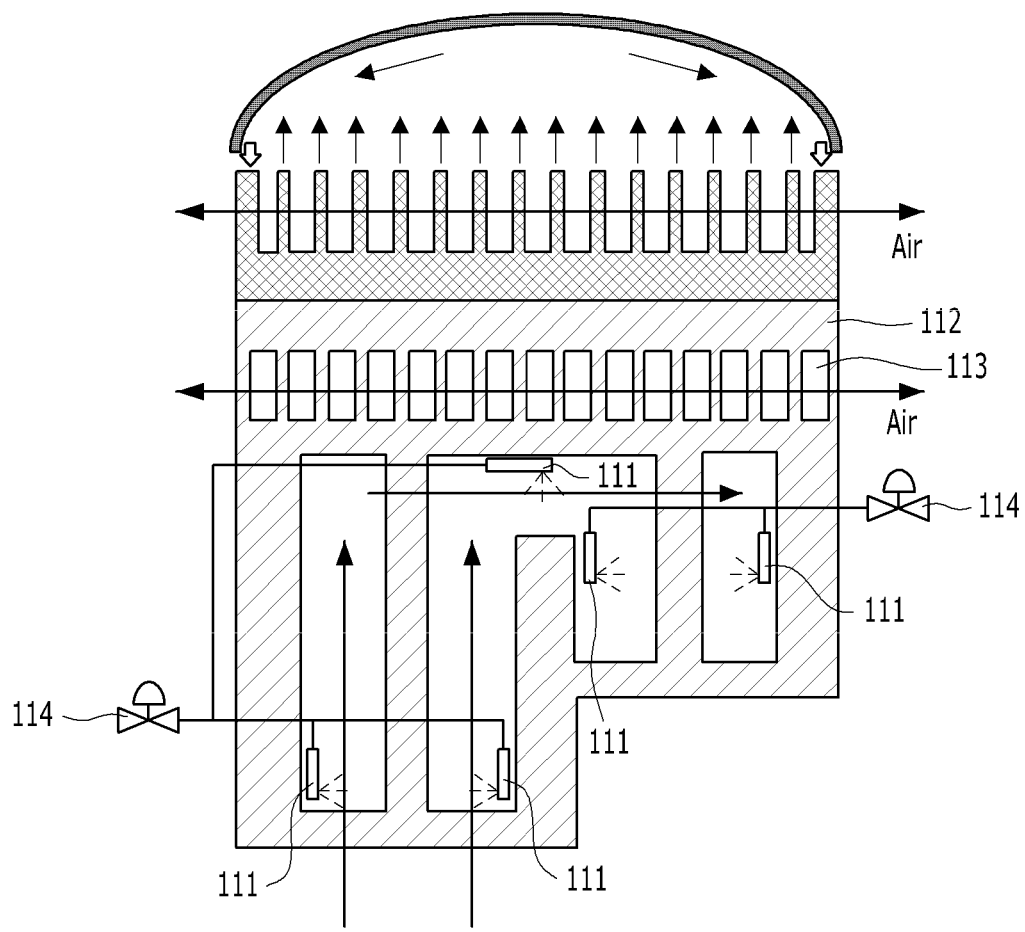

[FIG. 6]
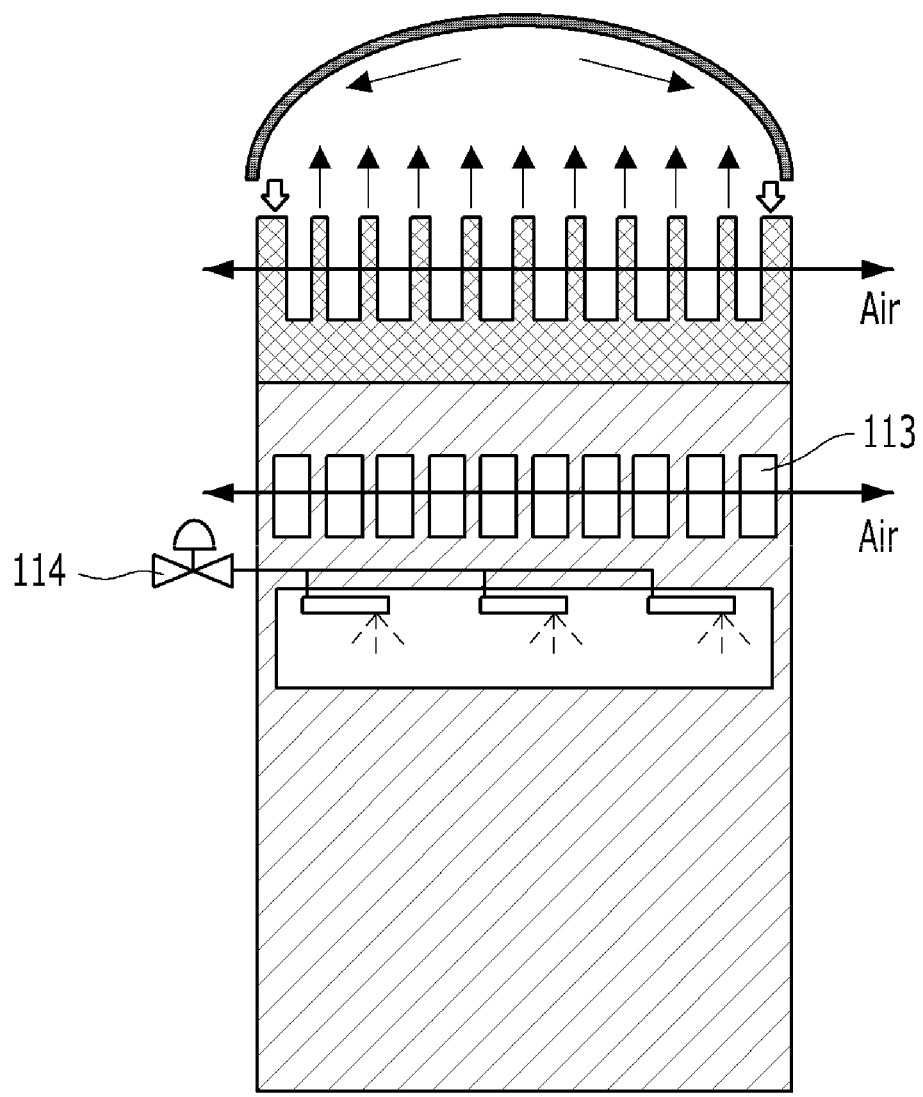

[FIG. 7]
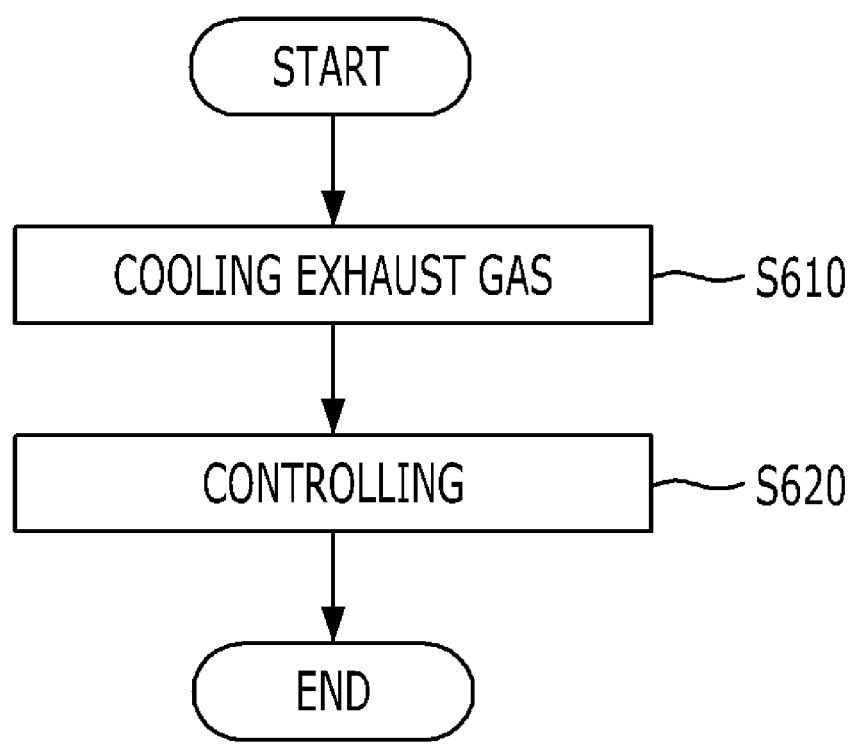

[FIG. 8]
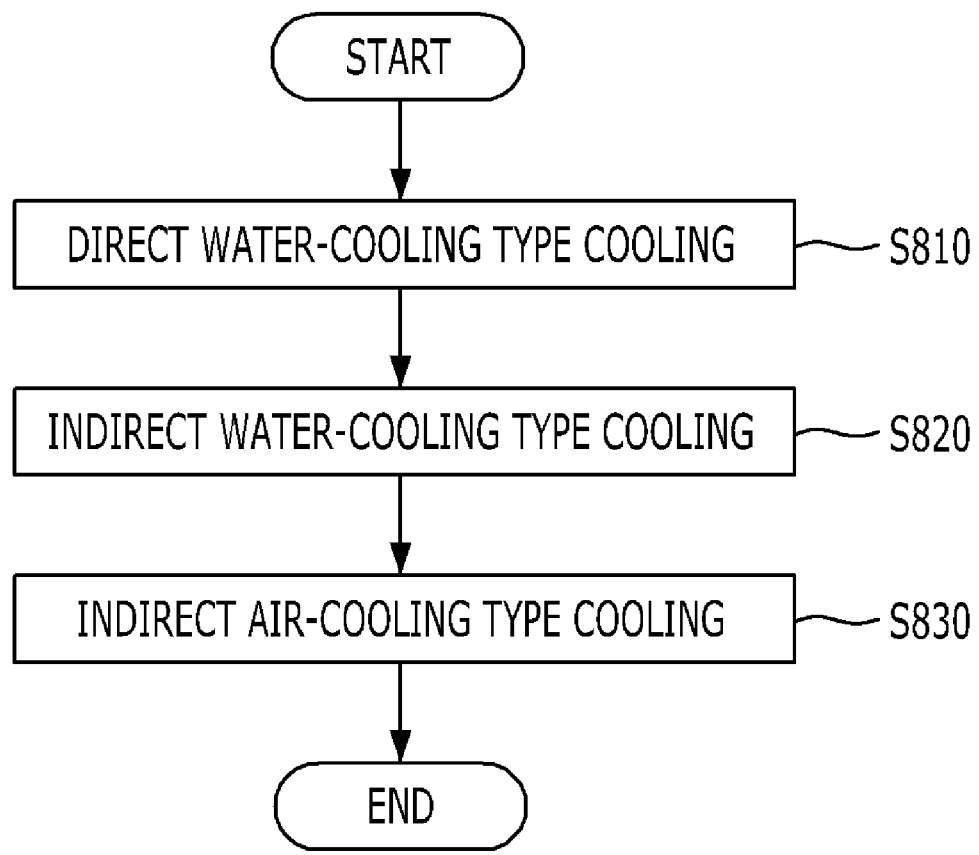

EXHAUST GAS COOLING DEVICE AND METHOD

CROSS-REFERENCE TO RELATED APPLICATIONS

This application is a national stage of International Application No. PCT/KR2017/008049, filed 26 Jul. 2017, which claims the benefit of priority to Korean Application(s) No. 10-2016-0095836, filed 28 Jul. 2016 in the Korean Intellectual Property Office, the disclosures of which are incorporated herein by reference.

FIELD OF THE DISCLOSURE

The present disclosure relates to an exhaust gas cooling device and method, and more particularly, to a device and method for installing an exhaust gas cooling device on the upper end of a duct of a heat recovery steam generator to cheaply cool exhaust gas even without occupying an additional dedicated area.

DESCRIPTION OF RELATED ART

For newly developed Heat Recovery Steam Generators (HRSGs), the components are designed to be thicker to maintain high steam pressure. Accordingly, considering the thermal stress experienced by the components of the Heat Recovery Steam Generator (HRSG), the increase rate of the energy of the exhaust gas of a Gas Turbine (GT) delivered to the Heat Recovery Steam Generator (HRSG) during the start-up procedure of a Combined Cycle Power Plant (CCPP) should be lower.

On the other hand, as the capacity of the newly developed Gas Turbine (GT) increases and the start-up time decreases, when the ramping of the Gas Turbine (GT) is maximally used during the start-up time of the Combined Cycle Power Plant (CCPP), the increase rate of the energy of the exhaust gas of the Gas Turbine (GT) increases. Accordingly, it is necessary to reduce the increase rate of the energy of the exhaust gas of the Gas Turbine (GT).

In the conventional Combined Cycle Power Plant (CCPP), it is necessary to contribute to the fast start-up of the Combined Cycle Power Plant (CCPP) by reducing the holding time of the Gas Turbine (GT) during the start-up procedure through the cooling of the exhaust gas of the Gas Turbine (GT).

Conventionally, upon the start-up of the Combined Cycle Power Plant (CCPP), various methods have been used to control the increase rate of the sudden temperature of the exhaust gas delivered from the Gas Turbine (GT) to the Heat Recovery Steam Generator (HRSG).

Conventionally, the cooling is performed by injecting air into a duct between the gas turbine and the heat recovery steam generator. In addition, in order to cool the exhaust gas having a high temperature and a large flow rate, it was necessary to inject a large amount of cooling air.

DETAILED DESCRIPTION OF THE INVENTION

The exhaust gas cooling device in accordance with the present disclosure includes an exhaust gas cooling unit located on the upper end of a duct of a heat recovery steam generator connected with a gas turbine and for flowing in and cooling exhaust gas flowed out from the gas turbine; and a control unit for controlling the exhaust gas cooling unit to lower the increase rate of the energy of the exhaust gas flowed into the heat recovery steam generator through the duct.

The exhaust gas cooling unit includes a first door for flowing the exhaust gas flowed in from the gas turbine into the exhaust gas cooling unit; and a second door for flowing the exhaust gas flowed into the exhaust gas cooling unit into the inlet of the heat recovery steam generator.

The first door or the second door has the curved surface formed on the upper and lower portions thereof.

The control unit opens the first door and the second door when the gas turbine discharges the exhaust gas.

The control unit determines the degree of the opening of the first door and the second door based on the current temperature at the inlet of the heat recovery steam generator and the temperature at the inlet of the heat recovery steam generator in the normal state.

The control unit opens the first door and the second door, and closes the first door and the second door when the energy of the exhaust gas flowed in through the first door and the energy of the exhaust gas flowed out from the second door become equal.

The exhaust gas cooling unit includes a direct water-cooling type cooling unit for injecting water in the passage through which the exhaust gas flows; an indirect water-cooling type cooling unit adjacent to the passage through which the exhaust gas flows and including water; and an indirect air-cooling type cooling unit adjacent to the indirect water-cooling type cooling unit, and including air.

The control unit adjusts the amount of water injected by the direct water-cooling type cooling unit based on the difference between the energy of the exhaust gas of the exhaust gas cooling unit and the energy of the exhaust gas that can be flowed into the inlet of the heat recovery steam generator, and the energy of the exhaust gas that can be flowed into the heat recovery steam generator is based on the current temperature at the inlet of the heat recovery steam generator.

The control unit adjusts the amount of water injected by the direct water-cooling type cooling unit based on the energy of the exhaust gas of the exhaust gas cooling unit, the energy of the exhaust gas that can be flowed into the inlet of the heat recovery steam generator, and the current energy at the inlet of the heat recovery steam generator, and the energy of the exhaust gas that can be flowed into the inlet of the heat recovery steam generator is based on the current temperature at the inlet of the heat recovery steam generator.

The energy of the exhaust gas is calculated based on the angle of the valve for controlling the fuel flowed into the gas turbine and the amount of water flowed into the gas turbine.

An exhaust gas cooling method includes cooling an exhaust gas flowing in and cooling the exhaust gas discharged from a gas turbine by an exhaust gas cooling unit located on the upper end of a duct of a heat recovery steam generator connected with the gas turbine.

An exhaust gas cooling method includes controlling the exhaust gas cooling unit to lower the increase rate of the energy of the exhaust gas flowed into the heat recovery steam generator through the duct.

The cooling the exhaust gas includes flowing the exhaust gas flowed in from the gas turbine into the exhaust gas cooling unit by controlling a first door of the exhaust gas cooling unit; and flowing the exhaust gas flowed into the exhaust gas cooling unit into the inlet of the heat recovery steam generator by controlling a second door of the exhaust gas cooling unit.

The first door or the second door has the curved surface formed on the upper and lower portions thereof.

The controlling opens the first door and the second door when the gas turbine discharges the exhaust gas.

The controlling determines the degree of the opening of the first door and the second door based on the current temperature at the inlet of the heat recovery steam generator and the temperature at the inlet of the heat recovery steam generator in the normal state.

The controlling opens the first door and the second door, and closes the first door and the second door when the energy of the exhaust gas flowed in through the first door and the energy of the exhaust gas flowed out through the second door become equal.

The cooling the exhaust gas includes a direct water-cooling type cooling unit injecting water into the passage through which the exhaust gas flows; an indirect water-cooling type cooling unit adjacent to the passage through which the exhaust gas flows and including water cooling the exhaust gas; and an indirect water-cooling type cooling unit adjacent to the indirect water-cooling type cooling unit cooling the exhaust gas using air.

The controlling adjusts the amount of water injected by the direct water-cooling type cooling unit based on the difference between the energy of the exhaust gas of the exhaust gas cooling unit and the energy of the exhaust gas that can be flowed into the inlet of the heat recovery steam generator.

The controlling adjusts the amount of water injected by the direct water-cooling type cooling unit based on the energy of the exhaust gas of the exhaust gas cooling unit, the energy of the exhaust gas that can be flowed into the inlet of the heat recovery steam generator, and the current energy at the inlet of the heat recovery steam generator.

The energy of the exhaust gas is calculated based on the angle of the valve for controlling the fuel flowed into the gas turbine and the amount of water flowed into the gas turbine.

The energy of the exhaust gas that can be flowed into the inlet of the heat recovery steam generator based on the current temperature at the inlet of the heat recovery steam generator is calculated based on the increase amount of the air temperature of a super heater included in the heat recovery steam generator.

OBJECT OF THE INVENTION

In connection with the objects of the present disclosure, an object of the present disclosure is to reduce the costs using a cheap cooling device in the cooling path for cooling the exhaust gas.

Another object of the present disclosure is to increase the number of installable cooling devices by lengthening the cooling path for cooling the exhaust gas, thus enhancing the cooling effect.

Still another object of the present disclosure is to effectively mix and use various cooling techniques such as water-cooling type and air-cooling type.

Yet another object of the present disclosure is not to use the additional dedicated area by connecting the cooling device to the empty space of the upper portion of the duct.

Still yet another object of the present disclosure is to apply the exhaust gas cooling device regardless of the manufacturer and model of the gas turbine and the heat recovery steam generator.

A further object of the present disclosure is to easily select the capacity of the exhaust gas cooling device based on only the start-up state information of the Combined Cycle Power Plant.

Another further object of the present disclosure is to additionally install the exhaust gas cooling device without changing the conventional Combined Cycle Power Plant system.

Still another further object of the present disclosure is to provide a device and a method for cooling the exhaust gas even without an expensive equipment such as a CCPP simulator used in the conventional Combined Cycle Power Plant.

Yet another further object of the present disclosure is to gradually operate the CCPP within the range in which the detailed configuration of the heat recovery cooling device is not damaged through the exhaust gas cooling device, thus minimizing the time to reach the normal state.

Meanwhile, an object of the present disclosure is not limed to the objects described above, various objects can be included within the scope that is obvious to those skilled in the art from the following detailed description.

Effects of the Invention

Then, regarding the effects in accordance with the present disclosure, according to the present disclosure, it is possible to reduce the costs using the cheap cooling device in the cooling path for cooling the exhaust gas.

In addition, according to the present disclosure, it is possible to increase the number of installable cooling devices by lengthening the cooling path for cooling the exhaust gas, thus enhancing the cooling effect.

In addition, according to the present disclosure, it is possible to effectively mix and use various cooling techniques such as water-cooling type and air-cooling type.

In addition, according to the present disclosure, it is possible not to use the additional dedicated area by connecting the cooling device to the empty space of the upper portion of the duct.

In addition, according to the present disclosure, it is possible to apply the exhaust gas cooling device regardless of the manufacturer and model of the gas turbine and the heat recovery steam generator.

In addition, according to the present disclosure, it is possible to easily select the capacity of the exhaust gas cooling device based on only the start-up state information of the Combined Cycle Power Plant.

In addition, according to the present disclosure, it is possible to additionally install the exhaust gas cooling device without changing the conventional Combined Cycle Power Plant system.

In addition, according to the present disclosure, it is possible to cool the exhaust gas even without the expensive equipment such as a CCPP simulator used in the conventional Combined Cycle Power Plant.

In addition, according to the present disclosure, it is possible to gradually operate the CCPP within the range in which the detailed configuration of the heat recovery cooling device is not damaged through the exhaust gas cooling device, thus minimizing the time to reach the normal state.

Meanwhile, the effects of the present disclosure are not limited to the effects described above, and various effects can be included within the scope that is obvious to those skilled in the art from the following description.

BRIEF DESCRIPTION OF THE DRAWINGS

FIG. 1 illustrates a configuration of an exhaust gas cooling device and a heat recovery steam generator in accordance with an embodiment of the present disclosure.

FIG. 2 illustrates a detailed configuration of the exhaust gas cooling device in accordance with the embodiment of the present disclosure.

FIG. 3 illustrates a detailed configuration of an exhaust gas cooling device in accordance with another embodiment of the present disclosure.

FIG. 4 illustrates the appearance of the exhaust gas cooling device in accordance with the embodiment of the present disclosure.

FIG. 5 illustrates the cut surface with respect to the A surface of the exhaust gas cooling device illustrated in FIG. 4.

FIG. 6 illustrates the cut surface with respect to the B surface of the exhaust gas cooling device illustrated in FIG. 4.

FIG. 7 illustrates the entire flows of an exhaust gas cooling method in accordance with an embodiment of the present disclosure.

FIG. 8 illustrates the entire flows of the exhaust gas cooling method in accordance with another embodiment of the present disclosure.

DESCRIPTION OF SPECIFIC EMBODIMENTS

The foregoing and further aspects are embodied through the embodiments described with reference to the accompanying drawings. It is to be understood that the components of each embodiment are capable of various combinations within the embodiments as long as they are not mutually exclusive or mutually contradictory. In addition, the present disclosure can be implemented in many various forms and is not limited to the embodiments described herein.

In order to clearly illustrate the claimed disclosure, parts not related to the description are omitted, and like parts are denoted by similar reference numerals throughout the specification. Then, it will be understood that when an element is referred to as "comprising" another element, the element is intended not to exclude other elements, but to further include other elements unless the context clearly indicates otherwise.

In addition, throughout this specification, when an element is referred to as being "connected" to another element, it can be "directly connected" to the other element or "electrically connected" to the other element with other elements interposed therebetween. In addition, in the specification, a signal means a quantity of electricity such as a voltage or a current.

As described in the specification, the term "unit" refers to a block configured to change or plug-in the system of hardware or software, that is, a unit or a block that performs a specific function in hardware or software.

FIG. 1 illustrates a configuration of an exhaust gas cooling device 100 and a heat recovery steam generator in accordance with an embodiment of the present disclosure.

A gas turbine 300 exhausts an exhaust gas. The gas turbine 300 includes a compressor, a combustor, and a turbine. The compressor is coupled in flow communication relationship with the combustor, and the combustor is coupled in flow communication relationship with the upstream of the turbine. The compressor and the turbine are coupled to a rotor shaft coupled to a generator, respectively. During operation, the air flowed into the gas turbine 300 is compressed by the compressor and then flowed into the combustor. The combustor receives fuel from a fuel supply source and mixes the fuel and the air to ignite the mixture, thus forming a hot combustion gas. The combustion gas is flowed into the turbine and causes the rotation of the turbine. The rotation of the turbine causes the shaft to rotate the generator, thus generating electricity. The combustion gas is discharged from the turbine and is flowed into the heat recovery steam generator (HRSG) 200 to facilitate heating of the incoming water, thus generating steam in the heat recovery steam generator 200.

The heat recovery steam generator 200 can include an inlet for receiving the exhaust gas from the gas turbine 300 and an outlet for extracting thermal energy from the exhaust gas and then discharging the exhaust gas received from the turbine. There is a flow path between the inlet and the outlet, in which a number of heat exchangers are located. The heat exchanger extracts heat from the exhaust gas when the gas moves from the inlet to the outlet.

The duct 210 is interposed between the heat recovery steam generator 200 and the gas turbine 300 and the gas discharged by the gas turbine 300 is delivered to the heat recovery steam generator 200 through the duct 210.

In an embodiment, the exhaust gas cooling device 100 includes an exhaust gas cooling unit 110 that is located on the upper end of the duct 210 of the heat recovery steam generator 200 connected with the gas turbine 300 to cool the exhaust gas discharged from the gas turbine 300, and a control unit 120 for controlling the exhaust gas cooling unit 110 to lower the increase rate of the energy of the exhaust gas flowed into the heat recovery steam generator 200 through the duct 210.

In an embodiment, the exhaust gas cooling device 100 is located on the upper end of the duct 210. The exhaust gas cooling unit 110 of the exhaust gas cooling device 100 is located on the upper end of the duct 210 of the heat recovery steam generator 200 connected with the gas turbine 300 to cool the exhaust gas discharged from the gas turbine 300. The exhaust gas cooling unit 110 is located on the upper end of the duct 210 and is connected so that the exhaust gas discharged from the gas turbine 300 can be flowed into the exhaust gas cooling unit 110 through the duct 210. The exhaust gas that has passed through the exhaust gas cooling unit 110 has lower temperature and energy than before passing through the exhaust gas cooling unit 110. That is, the exhaust gas cooling unit 110 forms a new path through which the exhaust gas flows and lowers the temperature of the exhaust gas through various cooling parts that are present in the path.

Accordingly, the exhaust gas cooling device 100 can reduce the costs using a cheap cooling device in the cooling path for cooling the exhaust gas. In addition, the exhaust gas cooling device 100 can increase the number of installable cooling devices by lengthening the cooling path for cooling the exhaust gas, thus increasing the cooling effect. In addition, the exhaust gas cooling device 100 cannot use an additional dedicated area by connecting the cooling device to the empty space of the upper portion of the duct 210. In addition, the exhaust gas cooling device 100 can be additionally installed on the upper end of the duct 210 even without changing a structure of a combined cycle power plant that generates combustible gas raw material by incompletely combusting hydrocarbon feedstock such as coal and generates electric energy using the gas turbine 300, such that it is not necessary to modify the existing combined cycle power plant system. In addition, the exhaust gas cooling device 100 can be applied regardless of the manufacturer and model of the gas turbine 300 and the heat recovery steam generator 200. In addition, it is possible to easily select the capacity of the exhaust gas cooling device 100 based on only the start-up state information of the combined cycle power plant system. In addition, the exhaust gas cooling device 100 can cool the exhaust gas even without an expensive equipment such as the combined cycle power plant system simulator conventionally used in the combined cycle power plant system.

The exhaust gas flowed out from the gas turbine 300 can be flowed directly to the heat recovery steam generator 200 through the duct 210 or can be flowed to the heat recovery steam generator 200 through the exhaust gas cooling unit 110. In addition, a part of the exhaust gas flowed out from the gas turbine 300 can pass through the duct 210, and the other part thereof can be delivered to the heat recovery steam generator 200 through the exhaust gas cooling unit.

In an embodiment, the control unit 120 controls the exhaust gas cooling unit 110 to lower the increase rate of the energy of the exhaust gas flowed into the heat recovery steam generator 200 through the duct 210. Lowering the increase rate of the energy of the exhaust gas flowed into the heat recovery steam generator 200 means to lower the temperature of the exhaust gas and flow it into the heat recovery steam generator 200. A detailed method by which the control unit 120 controls the exhaust gas cooling unit 110 will be described later.

FIG. 2 illustrates a detailed configuration of the exhaust gas cooling device 100 in accordance with an embodiment of the present disclosure.

In an embodiment, the exhaust gas cooling unit 110 includes a first door 130 flowing the exhaust gas flowed in from the gas turbine 300 into the exhaust gas cooling unit 110; and a second door 140 flowing the exhaust gas flowed into the exhaust gas cooling unit 110 into the inlet of the heat recovery steam generator 200.

In an embodiment, the first door 130 flows the exhaust gas flowed in from the gas turbine 300 into the exhaust gas cooling unit 110. When the first door 130 is fully closed, that is, when the first door 130 is closed by 100%, the exhaust gas cannot be flowed into the exhaust gas cooling unit 110. When the first door 130 is closed by 100%, the exhaust gas flowed out from the gas turbine 300 is not flowed into the exhaust gas cooling unit 110 at all, and is flowed into the heat recovery steam generator 200 through the duct 210.

When the first door 130 is fully opened, that is, when the first door 130 is opened by 100%, the exhaust gas is entirely flowed into the exhaust gas cooling unit 110. When the first door 130 is opened by 100%, the exhaust gas flowed out from the gas turbine 300 is entirely flowed into the exhaust gas cooling unit, and there is no the exhaust gas flowed into the heat recovery steam generator 200 through the duct 210.

When the first door 130 is opened by 50%, a part of the exhaust gas is flowed into the heat recovery steam generator 200 through the exhaust gas cooling unit 110, and the other part of the exhaust gas is flowed into the heat recovery steam generator 200 through the duct 210.

Depending on the degree of the opening and closing of the first door 130, the energy of the exhaust gas flowed out from the gas turbine 300 changes. Accordingly, the energy of the exhaust gas reaching the inlet of the heat recovery steam generator 200 also changes.

In an embodiment, the second door 140 flows the exhaust gas flowed into the exhaust gas cooling unit 110 into the inlet of the heat recovery steam generator 200. When the second door 140 is fully closed, that is, when the second door 140 is closed by 100%, the exhaust gas cannot be flowed out from the exhaust gas cooling unit 110. When the second door 140 is closed by 100%, there is no exhaust gas flowed out from the exhaust gas cooling unit 110 at all. The exhaust gas flowed out from the gas turbine 300 is only the exhaust gas flowed out through the duct 210.

When the second door 140 is fully opened, that is, when the second door 140 is opened by 100%, the exhaust gas is entirely flowed out from the exhaust gas cooling unit 110. When the second door 140 is opened by 100%, the exhaust gas is entirely flowed out from the exhaust gas cooling unit, and there is no exhaust gas flowed into the heat recovery steam generator 200 through the duct 210.

When the second door 140 is opened by 50%, a part of the exhaust gas is flowed into the heat recovery steam generator 200 through the exhaust gas cooling unit 110, and the other part of the exhaust gas is flowed into to the heat recovery steam generator 200 through the duct 210.

Depending on the degree of the opening and closing of the second door 140, the energy of the exhaust gas flowed out from the gas turbine 300 changes. Accordingly, the energy of the exhaust gas reaching the inlet of the heat recovery steam generator 200 also changes.

The control unit 120 identically controls the degree of the opening and closing of the first door 130 and the second door 140 at the same time. It is not limited thereto, and the first door 130 and the second door 140 can be separately controlled by changing the degree of the opening and closing thereof.

FIG. 3 illustrates a detailed configuration of the exhaust gas cooling device 100 in accordance with another embodiment of the present disclosure.

In an embodiment, the first door 130 or the second door 140 has the curved surfaces formed on the upper and lower portions thereof.

In an embodiment, the first door 130 flows the exhaust gas flowed in from the gas turbine 300 into the exhaust gas cooling unit 110. When the first door 130 is fully closed, that is, when the first door 130 is closed by 100%, the exhaust gas cannot be flowed into the exhaust gas cooling unit 110. When the first door 130 is closed by 100%, the exhaust gas flowed out from the gas turbine 300 is not flowed into the exhaust gas cooling unit 110 at all, and is flowed into the heat recovery steam generator 200 through the duct 210.

When the first door 130 is fully opened, that is, when the first door 130 is opened by 100%, the exhaust gas is entirely flowed into the exhaust gas cooling unit 110. When the first door 130 is opened by 100%, the exhaust gas flowed out from the gas turbine 300 is entirely flowed into the exhaust gas cooling unit, and there is no the exhaust gas flowed into the heat recovery steam generator 200 through the duct 210.

When the first door 130 is opened by 50%, a part of the exhaust gas is flowed into the heat recovery steam generator 200 through the exhaust gas cooling unit 110, and the other part of the exhaust gas is flowed into the heat recovery steam generator 200 through the duct 210.

Depending on the degree of the opening and closing of the first door 130, the energy of the exhaust gas flowed out from the gas turbine 300 changes. Accordingly, the energy of the exhaust gas reaching the inlet of the heat recovery steam generator 200 also changes.

In an embodiment, the second door 140 flows the exhaust gas flowed into the exhaust gas cooling unit 110 to the inlet of the heat recovery steam generator 200. When the second door 140 is fully closed, that is, when the second door 140 is closed by 100%, the exhaust gas cannot be flowed out from the exhaust gas cooling unit 110. When the second door 140 is closed by 100%, there is no exhaust gas flowed out from the exhaust gas cooling unit 110 at all. The exhaust gas flowed out from the gas turbine 300 is only the exhaust gas flowed out through the duct 210.

When the second door 140 is fully opened, that is, when the second door 140 is opened by 100%, the exhaust gas is entirely flowed out from the exhaust gas cooling unit 110. When the second door 140 is opened by 100%, the exhaust gas is entirely flowed out from the exhaust gas cooling unit, and there is no exhaust gas flowed into the heat recovery steam generator 200 through the duct 210.

When the second door 140 is opened by 50%, a part of the exhaust gas is flowed into the heat recovery steam generator 200 through the exhaust gas cooling unit 110, and the other part of the exhaust gas is flowed into the heat recovery steam generator 200 through the duct 210.

Depending on the degree of the opening and closing of the second door 140, the energy of the exhaust gas flowed out from the gas turbine 300 changes. Accordingly, the energy of the exhaust gas reaching the inlet of the heat recovery steam generator 200 also changes.

The upper and lower portions of the first door 130 and the second door 140 are formed with the curved surfaces so that the exhaust gas flowed out from the gas turbine 300 can be easily flowed into and out from the exhaust gas cooling unit 110. Since the curved surfaces are formed on the upper and lower portions thereof, the first door 130 and the second door 140 can have the semi-circular edge shape, but are not limited thereto. In the embodiment illustrated in FIG. 3, the curved surfaces can be formed on the entire of the upper and lower portions of the first door 130 and the second door 140, but the curved surfaces can be formed on parts of the first door 130 and the second door 140. In addition, the curved surface can be also formed on the entire of the upper and lower portions of any one of the first door 130 and the second door 140.

In an embodiment, the control unit 120 opens the first door 130 and the second door 140 when the gas turbine 300 discharges the exhaust gas. When the combined cycle power plant is operated, the exhaust gas is discharged from the gas turbine 300, and the temperature of the exhaust gas is a maximum of 600-700° C. When hot exhaust gas is instantaneously flowed into the heat recovery steam generator 200, parts of the heat recovery steam generator 200 can be damaged. In order to flow a lower temperature exhaust gas into the heat recovery steam generator 200, the control unit 120 opens the first door 130 and the second door 140.

In an embodiment, the control unit 120 determines the degree of the opening and closing of the first door 130 and the second door 140 based on the current temperature at the inlet of the heat recovery steam generator 200 and the temperature at the inlet of the heat recovery steam generator 200 in the normal state. Before the gas turbine 300 discharges the exhaust gas, the first door 130 and the second door 140 are closed. When the gas turbine 300 discharges the exhaust gas, the control unit 120 opens the first door 130 and the second door 140. In this time, the control unit 120 determines the degree of the opening and closing of the first door 130 and the second door 140 based on the current temperature at the inlet of the heat recovery steam generator 200 and the temperature at the inlet of the heat recovery steam generator 200 in the normal state.

The control unit 120 determines the degree of the opening and closing of the first door 130 and the second door 140 depending upon the ratio of the current temperature at the inlet of the heat recovery steam generator 200 and the temperature at the inlet of the heat recovery steam generator 200 in the normal state to open the first door 130 and the second door 140. The normal state is when the amount of various states determining each state in the dynamic phenomenon such as fluid flow, heat and mass transfer do not change in time. The temperature value at the inlet of the heat recovery steam generator 200 in the normal state is stored in the exhaust gas cooling device 100. The control unit 120 receives the temperature at the inlet of the heat recovery steam generator 200 from a temperature sensor when the exhaust gas is flowed out from the gas turbine 300. The control unit 120 determines the degree of the opening and closing of the first door 130 and the second door 140 based on the received temperature at the inlet of the heat recovery steam generator 200 and the stored temperature at the inlet of the heat recovery steam generator 200 in the normal state.

For example, when the received temperature at the inlet of the heat recovery steam generator 200 is 300° C. and the temperature at the inlet of the heat recovery steam generator 200 in the normal state is 600° C., the control unit 120 opens the first door 130 and the second door 140 by 50%.

After the first door 130 and the second door 140 are opened for the first time, the control unit 120 determines the degree of the opening and closing of the first door 130 and the second door 140 depending upon the following equation.

The allowable energy at the inlet of the heat recovery steam generator 200 is the maximum energy of the exhaust gas that can be flowed into the inlet of the heat recovery steam generator 200 based on the current temperature. The allowable energy at the inlet of the heat recovery steam generator 200 is the energy of the exhaust gas delivered through the duct 210 and the exhaust gas cooling unit 110.

The allowable energy at the inlet of the heat recovery steam generator $200 = (1-K4/100)*K3/100*$the energy of the exhaust gas$+(1-K3/100)*$the energy of the exhaust gas.

The K3 refers to the degree to which the first door 130 and the second door 140 are opened. When the K3 is 0, the first door 130 and the second door 140 are fully closed. When the K3 is 100, the first door 130 and the second door 140 are fully opened.

The K4 refers to the cooling efficiency. When the K4 is 30, the energy of the exhaust gas flowed out from the exhaust gas cooling unit 110 has been reduced by 30% based on the energy of the exhaust gas flowed into the exhaust gas cooling unit 110.

The equation for the allowable energy at the inlet of the heat recovery steam generator 200 is summarized with respect to the K3 as follows.

$K3 = 10000/K4(1-$Allowable Energy at HRSG Inlet$/$Exhaust Gas Energy$)$

The K3 refers to a value that is determined depending upon the K4. The K4 is the ratio of the energy of the exhaust gas flowed into the exhaust gas cooling unit 110 and the energy of the exhaust gas flowed out from the exhaust gas cooling unit 110. The energy of the exhaust gas flowed into the exhaust gas cooling unit 110 and the energy of the exhaust gas flowed out from the exhaust gas cooling unit 110 are measured in real time to be input to the control unit 120. The control unit 120 calculates the K4 based on the energy of the exhaust gas flowed into the exhaust gas cooling unit 110 and the energy of the exhaust gas flowed out from the exhaust gas cooling unit 110, and controls the degree of the opening of the first door 130 and the second door 140 depending upon the value of the K3 by calculating the K3 based on the K4.

In an embodiment, the control unit 120 opens the first door 130 and the second door 140, and closes the first door 130 and the second door 140 until the energy of the exhaust gas flowed into the exhaust gas cooling unit 110 and the energy of the exhaust gas flowed out from the exhaust gas cooling unit 110 become equal. The fact that the energy of the exhaust gas flowed into the exhaust gas cooling unit 110 and the energy of the exhaust gas flowed out from the exhaust gas cooling unit 110 become equal means that the normal state has been reached. In this case, the first door 130 and the second door 140 are closed so that the exhaust gas flows to the heat recovery steam generator 200 through the duct 210.

FIG. 4 illustrates the appearance of the exhaust gas cooling device 100 in accordance with an embodiment of the present disclosure.

A detailed configuration of the exhaust gas cooling unit 110 included in the exhaust gas cooling device 100 will be described later.

FIG. 5 illustrates the cut surface with respect to the A surface of the exhaust gas cooling device 100 illustrated in FIG. 4.

In an embodiment, the exhaust gas cooling unit 110 includes a direct water-cooling type cooling unit 111 for injecting water into the passage through which the exhaust gas flows; an indirect water-cooling type cooling unit 112 adjacent to the passage through which the exhaust gas flows and including water; and an indirect air-cooling type cooling unit 113 (refer to FIG. 6) adjacent to the indirect water-cooling type cooling unit 112 and including air.

In an embodiment, the direct water-cooling type cooling unit 111 injects water into the passage through which the exhaust gas flows. The control unit 120 controls a valve 114 of the direct water-cooling type cooling unit so that the direct water-cooling type cooling unit 111 injects water. As the water is injected, the temperature of the exhaust gas flowed into the exhaust gas cooling unit 110 is lowered. The number of the direct water-cooling type cooling units 111 is not limited.

In an embodiment, the indirect water-cooling type cooling unit 112 is adjacent to the passage through which the exhaust gas flows and includes water. The indirect water-cooling type cooling unit 112 is located adjacent to the passage through which the exhaust gas flows. The indirect water-cooling type cooling unit 112 is not directly connected with the exhaust gas, and is indirectly connected therewith through a wall dividing the passage of the exhaust gas and the passage of the water included in the indirect water-cooling type cooling unit 112. As the temperature of the exhaust gas is lowered, the water in the indirect water-cooling type cooling unit 112 can be heated. The heated water can rise and be converted into water vapor. The water vapor is liquefied on the roof of the exhaust gas cooling unit 110 to form with water droplets, and is collected into the indirect water-cooling type cooling unit 112 again.

In an embodiment, the indirect air-cooling type cooling unit 113 is adjacent to the indirect water-cooling type cooling unit 112 and includes air. In this time, the indirect air-cooling type cooling unit 113 can include low temperature air, and the indirect air-cooling type cooling unit 113 can also lower the temperature of the water of the indirect water-cooling type cooling unit 112.

In an embodiment, the control unit 120 adjusts the amount of water injected by the direct water-cooling type cooling unit 111 based on the difference between the energy of the exhaust gas of the exhaust gas cooling unit 110 and the energy of the exhaust gas that can be flowed into the inlet of the heat recovery steam generator 200 based on the current temperature at the inlet of the heat recovery steam generator 200.

The control unit 120 controls the degree of the opening of the valve 114 of the direct water-cooling type cooling unit by the ratio of the difference between the energy of the exhaust gas of the exhaust gas cooling unit 110 and the energy of the exhaust gas that can be flowed into the inlet of the heat recovery steam generator 200 based on the current temperature of the heat recovery steam generator 200 and the energy of the exhaust gas of the exhaust gas cooling unit 110. When the difference between the energy of the exhaust gas of the exhaust gas cooling unit 110 and the energy of the exhaust gas that can be flowed into the inlet of the heat recovery steam generator 200 based on the current temperature of the heat recovery steam generator 200 is greater than the energy of the exhaust gas of the exhaust gas cooling unit 110, the valve 114 of the direct water-cooling type cooling unit is opened a lot. When a ratio of the difference between the energy of the exhaust gas of the exhaust gas cooling unit 110 and the energy of the exhaust gas that can be flowed into the inlet of the heat recovery steam generator 200 based on the current temperature of the heat recovery steam generator 200 to the energy of the exhaust gas of the exhaust gas cooling unit 110 is 0.9, the valve 114 of the direct water-cooling type cooling unit is opened by 90%.

The above-described procedure can be expressed by the following equation.

The ratio at which the control unit 120 opens the valve 114 of the direct water-cooling type cooling unit=(the energy of the exhaust gas of the exhaust gas cooling unit 110−the energy of the exhaust gas that can be flowed into the inlet of the heat recovery steam generator 200 based on the current temperature at the inlet of the heat recovery steam generator 200)/(the energy of the exhaust gas of the exhaust gas cooling unit 110).

In an embodiment, the control unit 120 can adjust the amount of water injected by the direct water-cooling type cooling unit 111 based on the energy of the exhaust gas of the exhaust gas cooling unit 110, the energy of the exhaust gas that can be flowed into the inlet of the heat recovery steam generator 200 based on the current temperature at the inlet of the heat recovery steam generator 200, and the current energy at the inlet of the heat recovery steam generator 200.

The above-described procedure can be expressed by the following equation.

The ratio by which the control unit 120 opens the valve 114 of the direct water-cooling type cooling unit=(K1*(the energy of the exhaust gas of the exhaust gas cooling unit 110−K2*(the energy of the exhaust gas that can be flowed into the inlet of the heat recovery steam generator 200 based on the current temperature at the inlet of the heat recovery steam generator 200−the current energy at the inlet of the heat recovery steam generator 200)))/(the energy of the exhaust gas of the exhaust gas cooling unit 110).

The K1 refers to a value that is determined from the energy of water injected by the direct water-cooling type cooling unit 111, and the K2 refers to a value that is determined depending upon the state of the exhaust gas cooling unit 110. The K1 and the K2 are values between 0 and 1, for example, 1.

In an embodiment, the energy of the exhaust gas is calculated based on both the angle of the valve that controls the fuel flowed into the gas turbine 300 and the amount of air flowed into the gas turbine 300. The energy of the exhaust gas is calculated using the fuel flowed into the gas turbine 300 and the amount of air flowed into the gas turbine 300 as an input value of a specific function. The specific function is calculated based on the physics and machine learning of the gas turbine 300. The energy of the exhaust gas can be measured by a sensor.

In an embodiment, the energy of the exhaust gas that can be flowed into the inlet of the heat recovery steam generator 200 based on the current temperature at the inlet of the heat recovery steam generator 200 is calculated based on the increase amount of the air temperature of a super heater located on one end of the heat recovery steam generator 200. The energy of the exhaust gas that can be flowed into the inlet of the heat recovery steam generator 200 based on the current temperature at the inlet of the heat recovery steam generator 200 is calculated using the increase amount of the air temperature of the super heater located on one end of the heat recovery steam generator 200 as an input value of a specific function. The specific function is calculated based on the physics and machine learning of the super heater. The energy of the exhaust gas that can be flowed into the inlet of the heat recovery steam generator 200 based on the current temperature at the inlet of the heat recovery steam generator 200 can be measured by the sensor.

FIG. 6 illustrates the cut surface with respect to the B surface of the exhaust gas cooling device 100 illustrated in FIG. 4.

In an embodiment, the exhaust gas cooling unit 110 includes the direct water-cooling type cooling unit 111 for injecting water into the passage through which the exhaust gas flows; the indirect water-cooling type cooling unit 112 adjacent to the passage through which the exhaust gas flows and including water; and the indirect air-cooling type cooling unit 113 adjacent to the indirect water-cooling type cooling unit 112 and including air.

In an embodiment, the direct water-cooling type cooling unit 111 injects water into the passage through which the exhaust gas flows. The control unit 120 controls the valve 114 of the direct water-cooling type cooling unit so that the direct water-cooling type cooling unit 111 injects water. As the water is injected, the temperature of the exhaust gas flowed into the exhaust gas cooling unit 110 is lowered. The number of the direct water-cooling type cooling units 111 is not limited.

In an embodiment, the indirect water-cooling type cooling unit 112 is adjacent to the passage through which the exhaust gas flows and includes water. The indirect water-cooling type cooling unit 112 is located adjacent to the passage through which the exhaust gas flows. The indirect water-cooling type cooling unit 112 is not directly connected with the exhaust gas, and is indirectly connected therewith through a wall dividing the passage of the exhaust gas and the passage of the water included in the indirect water-cooling type cooling unit 112. As the temperature of the exhaust gas is lowered, the water in the indirect water-cooling type cooling unit 112 can be heated. The heated water can rise and be converted into water vapor. The water vapor is liquefied on the roof of the exhaust gas cooling unit 110 to form with water droplets, and is collected into the indirect water-cooling type cooling unit 112 again.

In an embodiment, the indirect air-cooling type cooling unit 113 is adjacent to the indirect water-cooling type cooling unit 112 and includes air. The indirect air-cooling type cooling unit 113 includes low temperature air. The indirect air-cooling type cooling unit 113 lowers the temperature of the water for cooling the exhaust gas of the indirect water-cooling type cooling unit 112 again.

In an embodiment, the control unit 120 adjusts the amount of water injected by the direct water-cooling type cooling unit 111 based on the difference between the energy of the exhaust gas of the exhaust gas cooling unit 110 and the energy of the exhaust gas that can be flowed into the inlet of the heat recovery steam generator 200 based on the current temperature at the inlet of the heat recovery steam generator 200.

The control unit 120 controls the degree of the opening of the valve 114 of the direct water-cooling type cooling unit by the ratio of the difference between the energy of the exhaust gas of the exhaust gas cooling unit 110 and the energy of the exhaust gas that can be flowed into the inlet of the heat recovery steam generator 200 based on the current temperature at the inlet of the heat recovery steam generator 200 and the energy of the exhaust gas of the exhaust gas cooling unit 110. When the difference between the energy of the exhaust gas of the exhaust gas cooling unit 110 and the energy of the exhaust gas that can be flowed into the inlet of the heat recovery steam generator 200 based on the current temperature at the inlet of the heat recovery steam generator 200 is greater than the energy of the exhaust gas of the exhaust gas cooling unit 110, the valve 114 of the direct water-cooling type cooling unit 114 is opened a lot. When a ratio of the difference between the energy of the exhaust gas of the exhaust gas cooling unit 110 and the energy of the exhaust gas that can be flowed into the inlet of the heat recovery steam generator 200 based on the current temperature at the inlet of the heat recovery steam generator 200 to the energy of the exhaust gas of the exhaust gas cooling unit 110 is 0.9, the valve 114 of the direct water-cooling type cooling unit is opened by 90%.

The above-described procedure can be expressed by the following equation.

The ratio at which the control unit 120 opens the valve 114 of the direct water-cooling type cooling unit=(the energy of the exhaust gas of the exhaust gas cooling unit 110−the energy of the exhaust gas that can be flowed into the inlet of the heat recovery steam generator 200 based on the current temperature at the inlet of the heat recovery steam generator 200)/(the energy of the exhaust gas of the exhaust gas cooling unit 110).

In an embodiment, the control unit 120 adjusts the amount of water injected by the direct water-cooling type cooling unit 111 based on the energy of the exhaust gas of the exhaust gas cooling unit 110, the exhaust gas that can be flowed into the inlet of the heat recovery steam generator 200 based on the current temperature at the inlet of the heat recovery steam generator 200, and the current energy at the inlet of the heat recovery steam generator 200.

The above-described procedure can be expressed by the following equation.

The ratio by which the control unit 120 opens the valve 114 of the direct water-cooling type cooling unit=(K1*(the energy of the exhaust gas of the exhaust gas cooling unit 110−K2*(the energy of the exhaust gas that can be flowed into the inlet of the heat recovery steam generator 200 based on the current temperature at the inlet of the heat recovery steam generator 200−the current energy at the inlet of the heat recovery steam generator 200)))/(the energy of the exhaust gas of the exhaust gas cooling unit 110).

The K1 refers a value that is determined from the energy of water injected by the direct water-cooling type cooling unit 111, and the K2 refers to a value that is determined depending upon the state of the exhaust gas cooling unit 110. The K1 and the K2 are values between 0 and 1, for example, 1.

In an embodiment, the energy of the exhaust gas is calculated based on both the angle of the valve that controls the fuel flowed into the gas turbine 300 and the amount of air flowed into the gas turbine 300. The energy of the exhaust gas is calculated using the fuel flowed into the gas turbine 300 and the amount of air flowed into the gas turbine 300 as an input value of a specific function. The specific function is calculated based on the physics and machine learning of the gas turbine 300. The energy of the exhaust gas can be measured by the sensor.

In an embodiment, the energy of the exhaust gas that can be flowed into the inlet of the heat recovery steam generator 200 based on the current temperature at the inlet of the heat recovery steam generator 200 is calculated based on the increase amount of air temperature of the super heater located on one end of the heat recovery steam generator 200. The energy of the exhaust gas that can be flowed into the inlet of the heat recovery steam generator 200 based on the current temperature at the inlet of the heat recovery steam generator 200 is calculated using the increase amount of air temperature of the super heater as an input value of a specific function. The specific function is calculated based on the physics and machine learning of the super heater. The energy of the exhaust gas that can be flowed into the inlet of the heat recovery steam generator 200 based on the current temperature at the inlet of the heat recovery steam generator 200 can be measured by the sensor.

FIG. 7 illustrates the entire flows of an exhaust gas cooling method in accordance with an embodiment of the present disclosure.

The gas turbine discharges an exhaust gas. The gas turbine includes a compressor, a combustor, and a turbine. The compressor is coupled in flow communication relationship with the combustor, and the combustor is coupled in flow communication relationship with the upstream of the turbine. The compressor and the turbine are coupled to a rotor shaft coupled to a generator, respectively. During operation, the air flowed into the gas turbine is compressed by the compressor and then flowed into the combustor. The combustor receives fuel from a fuel supply source and mixes the fuel and the air to ignite the mixture, thus forming hot combustion gas. The combustion gas is flowed into the turbine and causes the rotation of the turbine. The rotation of the turbine causes the shaft to rotate the generator, which generates electricity. The combustion gas is discharged from the turbine and is flowed into the heat recovery steam generator (HRSG) to facilitate the heating of the incoming water, thus generating steam in the heat recovery steam generator.

The heat recovery steam generator can include an inlet for receiving the exhaust gas from the gas turbine and an outlet for extracting thermal energy from the exhaust gas and then discharging the exhaust gas received from the turbine. There is a flow path between the inlet and the outlet, in which a number of heat exchangers are located. The heat exchanger extracts heat from the exhaust gas when the gas moves from the inlet to the outlet.

The duct is interposed between the heat recovery steam generator and the gas turbine, and the gas discharged by the gas turbine is delivered to the heat recovery steam generator through the duct.

In an embodiment, the exhaust gas cooling device includes cooling the exhaust gas S610 cooling the exhaust gas discharged from the gas turbine by being located on the upper end of the duct of the heat recovery steam generator connected with the gas turbine; and controlling S620 the cooling the exhaust gas S610 to lower the increase rate of the energy of the exhaust gas flowed into the heat recovery steam generator through the duct.

In an embodiment, the exhaust gas cooling device is located on the upper end of the duct. The cooling the exhaust gas S610 of the exhaust gas cooling device cools the exhaust gas discharged from the gas turbine by being located on the upper end of the duct of the heat recovery steam generator connected with the gas turbine. The cooling the exhaust gas S610 is located on the upper end of the duct, and connected so that the exhaust gas flowed out from the gas turbine is flowed to the cooling the exhaust gas S610 through the duct. The exhaust gas that has passed through the cooling the exhaust gas S610 has lower temperature and energy than before passing through the cooling the exhaust gas S610. That is, the cooling the exhaust gas S610 forms a new path through which the exhaust gas flows and lowers the temperature of the exhaust gas through various cooling parts that are present in the path.

Accordingly, the exhaust gas cooling device can reduce the costs using a cheap cooling device for cooling the exhaust gas. In addition, the exhaust gas cooling device can increase the number of the installable cooling devices by lengthening the cooling path for cooling the exhaust gas, thus increasing the cooling effect. In addition, the exhaust gas cooling device cannot use an additional dedicated area by connecting the cooling device to the empty space of the upper portion of the duct. In addition, the exhaust gas cooling device is additionally installed on the upper end of the duct without changing the structure of the combined cycle power plant that generates combustible gas raw material by incompletely combusting hydrocarbon feedstock such as coal to generate electric energy using the gas turbine, such that it is not necessary to modify the existing combined cycle power plant system. In addition, the exhaust gas cooling device can be applied regardless of the manufacturer and model of the gas turbine and the heat recovery steam generator. In addition, it is possible to easily select the capacity of the exhaust gas cooling device based on only the start-up state information of the combined cycle power plant system. In addition, the exhaust gas cooling device can cool the exhaust gas even without an expensive equipment such as the combined cycle power plant system simulator conventionally used in the combined cycle power plant system.

The exhaust gas flowed out from the gas turbine is flowed directly to the heat recovery steam generator through the duct, or to the heat recovery steam generator through the cooling the exhaust gas S610. In addition, a part of the exhaust gas flowed out from the gas turbine can pass through the duct, and the other part can be delivered to the heat recovery steam generator through the exhaust gas cooling unit.

In an embodiment, the controlling S620 controls the cooling the exhaust gas S610 to lower the increase rate of the energy of the exhaust gas flowed into the heat recovery steam generator through the duct. The lowering the increase rate of the energy of the exhaust gas flowed into the heat recovery steam generator means to lower the temperature of the exhaust gas itself to be flowed into the heat recovery steam generator.

A detailed method by which the controlling S620 controls the cooling the exhaust gas S610 will be described later.

In an embodiment, the exhaust gas cooling unit includes a first door proceeding the exhaust gas flowed in from the gas turbine to the cooling the exhaust gas S610; and a second door for flowing the exhaust gas proceeded to the cooling the exhaust gas S610 to the inlet of the heat recovery steam generator.

In an embodiment, the first door flows the exhaust gas flowed in from the gas turbine into the exhaust gas cooling unit. When the first door is fully closed, that is, when it is closed by 100%, the exhaust gas cannot be flowed into the exhaust gas cooling unit. When the first door is closed by 100%, the exhaust gas flowed out from the gas turbine is not flowed into the exhaust gas cooling unit at all, and flowed into the heat recovery steam generator through the duct.

When the first door is fully opened, that is, when the first door is opened by 100%, the exhaust gas entirely proceeds to the cooling the exhaust gas S610. When the first door is opened by 100%, the exhaust gas flowed out from the gas turbine is entirely flowed into the exhaust gas cooling unit, and there is no exhaust gas flowed into the heat recovery steam generator through the duct.

When the first door is opened by 50%, a part of the exhaust gas is flowed into the heat recovery steam generator through the cooling the exhaust gas S610, and the other part of the exhaust gas is flowed into the heat recovery steam generator through the duct.

Depending on the degree of the opening and closing of the first door, the energy of the exhaust gas flowed out from the gas turbine changes. Accordingly, the energy of the exhaust gas reaching the inlet of the heat recovery steam generator also changes.

In an embodiment, the second door flows the exhaust gas proceeded to the cooling the exhaust gas S610 to the inlet of the heat recovery steam generator. When the second door is fully closed, that is, when it is closed by 100%, the exhaust gas cannot be flowed out from the exhaust gas cooling unit. When the second door is closed by 100%, the exhaust gas flowed out from the exhaust gas cooling unit is not present at all. The exhaust gas flowed out from the gas turbine is only the exhaust gas flowed out through the duct.

When the second door is fully opened, that is, when the second door is opened by 100%, the exhaust gas is entirely flowed out from the exhaust gas cooling unit. When the second door is opened by 100%, the exhaust gas is entirely flowed out from the exhaust gas cooling unit, and there is no exhaust gas flowed into the heat recovery steam generator through the duct.

When the second door is opened by 50%, a part of the exhaust gas is flowed into the heat recovery steam generator through the cooling the exhaust gas S610, and the other part of the exhaust gas is flowed into the heat recovery steam generator through the duct.

Depending on the degree of the opening and closing of the second door, the energy of the exhaust gas flowed out from the gas turbine changes. Accordingly, the energy of the exhaust gas reaching the inlet of the heat recovery steam generator also changes.

The controlling S620 identically controls the degree of the opening and closing of the first door and the second door at the same time. It is not limited thereto, and can separately control while changing the degree of the opening and closing of the first door and the second door.

In an embodiment, the first door or the second door has the curved surface formed on the upper and lower portions thereof.

In an embodiment, the first door proceeds the exhaust gas flowed in from the gas turbine to the cooling the exhaust gas S610. When the first door is fully closed, that is, when it is closed by 100%, the exhaust gas cannot be flowed into the exhaust gas cooling unit. When the first door is closed by 100%, the exhaust gas flowed out from the gas turbine is not flowed into the exhaust gas cooling device at all, and is flowed into the heat recovery steam generator through the duct.

When the first door is fully opened, that is, when the first door is opened by 100%, the exhaust gas entirely proceeds to the cooling the exhaust gas S610. When the first door is opened by 100%, the exhaust gas flowed out from the gas turbine is entirely flowed into the exhaust gas cooling unit, and there is no exhaust gas flowed into the heat recovery steam generator through the duct.

When the first door is opened by 50%, a part of the exhaust gas is flowed into the heat recovery steam generator through the cooling the exhaust gas S610, and the other part of the exhaust gas is flowed into the heat recovery steam generator through the duct.

Depending on the degree of the opening and closing of the first door, the energy of the exhaust gas flowed out from the gas turbine changes. Accordingly, the energy of the exhaust gas reaching the inlet of the heat recovery steam generator also changes.

In an embodiment, the second door flows the exhaust gas flowed into the exhaust gas cooling unit to the inlet of the heat recovery steam generator. When the second door is fully closed, that is, when it is closed by 100%, the exhaust gas cannot be flowed out from the exhaust gas cooling unit. When the second door is closed by 100%, the exhaust gas flowed out from the exhaust gas cooling unit is not present at all, and the exhaust gas flowed out from the gas turbine is only the exhaust gas flowed out through the duct.

When the second door is fully opened, that is, when the second door is opened by 100%, the exhaust gas is entirely flowed out from the exhaust gas cooling unit. When the second door is opened by 100%, the exhaust gas is entirely flowed out from the exhaust gas cooling unit, and there is no exhaust gas flowed into the heat recovery steam generator through the duct.

When the second door is opened by 50%, a part of the exhaust gas is flowed into the heat recovery steam generator through the cooling the exhaust gas S610, and the other part of the exhaust gas is flowed into the heat recovery steam generator through the duct.

Depending on the degree of the opening and closing of the second door, the energy of the exhaust gas flowed out from the gas turbine changes. Accordingly, the energy of the exhaust gas reaching the inlet of the heat recovery steam generator also changes.

The first door and the second door have the curved surfaces on the upper and lower portions thereof, such that the exhaust gas flowed out from the gas turbine can be easily flowed into and out from the exhaust gas cooling unit. Since the curved surface is formed on the upper and lower portions thereof, the first door and the second door can have the semi-circular edge shape, but are not limited thereto. In the embodiment illustrated in FIG. 3, the curved surfaces are formed on the entire of the upper and lower portions of the first door and the second door, but the curved surfaces can be formed on parts of the upper and lower portions of the first door and the second door. In addition, the curved surface can be also formed on the entire of the upper and lower portions of any one of the first door and the second door.

In an embodiment, the controlling S620 opens the first door and the second door when the gas turbine discharges the exhaust gas. When the combined cycle power plant is operated, the exhaust gas is exhausted from the gas turbine, and the temperature of the exhaust gas is a maximum of 600~700° C. When hot exhaust gas is instantaneously flowed into the heat recovery steam generator, parts of the heat recovery steam generator can be damaged. In order to flow a lower temperature exhaust gas into the heat recovery steam generator, the controlling S620 opens the first door and the second door.

In an embodiment, the controlling S620 determines the degree of the opening and closing of the first door and the second door based on the current temperature at the inlet of the heat recovery steam generator and the temperature at the inlet of the heat recovery steam generator in the normal state. Before the gas turbine discharges the exhaust gas, the first door and the second door are closed. When the gas turbine discharges the exhaust gas, the controlling S620 opens the first door and the second door. In this time, the controlling S620 determines the degree of the opening and closing of the first door and the second door based on the current temperature at the inlet of the heat recovery steam generator and the temperature at the inlet of the heat recovery steam generator in the normal state.

The controlling S620 determines the degree of the opening and closing of the first door and the second door depending upon the ratio between the current temperature at the inlet of the heat recovery steam generator and the temperature at the inlet of the heat recovery steam generator in the normal state to open the first door and the second door. The normal state is when the amount of various states that determine each state in the dynamic phenomenon such as fluid flow, heat and mass transfer do not change in time. The temperature value at the inlet of the heat recovery steam generator in the normal state is stored in the exhaust gas cooling device. The controlling S620 includes receiving the temperature at the inlet of the heat recovery steam generator from the temperature sensor when the exhaust gas is flowed out from the gas turbine. The controlling S620 determines the degree of the opening and closing of the first door and the second door based on the received temperature at the inlet of the heat recovery steam generator and the stored temperature at the inlet of the heat recovery steam generator in the normal state.

For example, when the temperature at the inlet of the heat recovery steam generator is 300° C. and the temperature at the inlet of the heat recovery steam generator in the normal state is 600° C., the controlling S620 opens the first door and the second door by 50%.

After the first door and the second door are opened for the first time, the controlling S620 determines the degree of the opening and closing of the first door and the second door depending upon the following equation.

The allowable energy at the inlet of the heat recovery steam generator is the maximum energy of the exhaust gas that can be flowed into the inlet of the heat recovery steam generator based on the current temperature. The allowable energy at the inlet of the heat recovery steam generator is the energy of the exhaust gas delivered through the duct and the cooling the exhaust gas S610.

The allowable energy at the inlet of the heat recovery steam generator=$(1-K4/100)*K3/100*$the energy of the exhaust gas+$(1-K3/100)*$the energy of the exhaust gas.

The K3 refers to the degree to which the first door and the second door are opened. When the K3 is 0, the first door and the second door are fully closed. When the K3 is 100, the first door and the second door are fully opened.

The K4 refers to the cooling efficiency. When the K4 is 30, it means that the energy of the exhaust gas flowed out from the cooling the exhaust gas S610 was reduced by 30% based on the energy of the exhaust gas flowed into the cooling the exhaust gas S610.

The equation for the allowable energy at the inlet of the heat recovery steam generator is summarized with respect to the K3 as follows.

$K3=10000/K4(1-$Allowable Energy at HRSG Inlet/ Exhaust Gas Energy)

The K3 refers to a value that is determined depending upon the K4. The K4 refers to the ratio of the energy of the exhaust gas flowed into the exhaust gas cooling unit and the energy of the exhaust gas flowed out from the exhaust gas cooling unit. The energy of the exhaust gas flowed into the exhaust gas cooling unit and the energy of the exhaust gas flowed out from the exhaust gas cooling unit are measured in real time and input to the control unit. The controlling S620 includes controlling the degree of the opening of the first door and the second door depending upon a value of the K3 by calculating the K4 based the energy of the exhaust gas flowed into the exhaust gas cooling unit and the energy of the exhaust gas flowed out from the exhaust gas cooling unit and calculating the K3 based on the K4.

In an embodiment, the controlling S620 opens the first door and the second door, and closes the first door and the second door when the energy of the exhaust gas flowed into the cooling the exhaust gas S610 and the energy of the exhaust gas flowed out from the exhaust gas cooling unit become equal. The fact that the energy of the exhaust gas flowed into the exhaust gas cooling unit and the energy of the exhaust gas flowed out from the exhaust gas cooling unit become equal means to reach the normal state. In this case, the first door and the second door are closed so that the exhaust gas flows to the heat recovery steam generator through the duct.

FIG. 8 illustrates the entire flows of an exhaust gas cooling method in accordance with another embodiment of the present disclosure.

In an embodiment, the cooling the exhaust gas S610 includes a direct water-cooling type cooling S810 injecting water into the passage through which the exhaust gas flows; an indirect water-cooling type cooling S820 adjacent to the passage through which the exhaust gas flows and including water; and an indirect air-cooling type cooling S830.

In an embodiment, the direct water-cooling type cooling S810 injects water into the passage through which the exhaust gas flows. The control unit controls the valve of the direct water-cooling type cooling unit so that the direct water-cooling type cooling unit injects the water. As the water is injected, the temperature of the exhaust gas flowed into the exhaust gas cooling unit is lowered. The number of direct water-cooling type cooling units is not limited.

In an embodiment, the indirect water-cooling type cooling S820 cools the exhaust gas by allowing it to pass through the passage through which water passes. The indirect water-cooling type cooling unit is adjacent to the passage through which the exhaust gas flows and includes water. The indirect water-cooling type cooling unit is located adjacent to the passage through which the exhaust gas flows. The indirect water-cooling type cooling unit is not directly connected with the exhaust gas, and is indirectly connected through a wall dividing the passage of the exhaust gas and the passage of the water included in the indirect water-cooling type cooling unit. As the temperature of the exhaust gas is lowered, the water of the indirect water-cooling type cooling unit can be heated. The heated water can rise and be converted into water vapor. The water vapor is liquefied on the roof of the exhaust gas cooling unit to form with water droplets and is collected into the indirect water-cooling type cooling unit again.

In an embodiment, the exhaust gas can be also cooled by the indirect air-cooling type cooling S830. The indirect air-cooling type cooling unit is adjacent to the indirect water-cooling type cooling unit and includes air. The indirect air-cooling type cooling unit includes low temperature air. The indirect air-cooling type cooling unit lowers the temperature of the water for cooling the exhaust gas of the indirect water-cooling type cooling unit again.

In an embodiment, the controlling S620 adjusts the amount of water injected by the direct water-cooling type cooling unit based on the difference between the energy of the exhaust gas of the exhaust gas cooling unit and the energy of the exhaust gas that can be flowed into the inlet of the heat recovery steam generator, and the energy of the exhaust gas that can be flowed into the inlet of the heat recovery steam generator is based on the current temperature at the inlet of the heat recovery steam generator.

The controlling S620 controls the degree of the opening of the valve of the direct water-cooling type cooling unit by the ratio of the difference between the energy of the exhaust gas of the exhaust gas cooling unit and the energy of the exhaust gas that can be flowed into the inlet of the heat recovery steam generator based on the current temperature at the inlet of the heat recovery steam generator and the energy of the exhaust gas of the exhaust gas cooling unit. When the difference between the energy of the exhaust gas of the exhaust gas cooling unit and the energy of the exhaust gas that can be flowed into the inlet of the heat recovery steam generator based on the current temperature at the inlet of the heat recovery steam generator is greater than the energy of the exhaust gas of the exhaust gas cooling unit, the valve of the direct water-cooling type cooling unit is opened a lot. When a ratio of the difference between the energy of the exhaust gas of the exhaust gas cooling unit and the energy of the exhaust gas that can be flowed into the inlet of the heat recovery steam generator based on the current temperature at the inlet of the heat recovery steam generator to the energy of the exhaust gas of the exhaust gas cooling unit is 0.9, the valve of the direct water-cooling type cooling unit is opened by 90%.

The above-described procedure can be expressed by the following equation.

The ratio of opening the valve of the direct water-cooling type cooling unit in the controlling S620=(the energy of the exhaust gas of the exhaust gas cooling unit−the energy of the exhaust gas that can be flowed into the inlet of the heat recovery steam generator based on the current temperature at the inlet of the heat recovery steam generator)/(the energy of the exhaust gas of the exhaust gas cooling unit).

In an embodiment, the controlling S620 adjusts the amount of water injected by the direct water-cooling type cooling unit based on the energy of the exhaust gas of the exhaust gas cooling unit, the energy of the exhaust gas that can be flowed into the inlet of the heat recovery steam generator based on the current temperature of the heat recovery steam generator, and the current energy at the inlet of the heat recovery steam generator.

The above-described procedure can be expressed by the following equation.

The ratio of opening the valve of the direct water-cooling type cooling unit in the controlling S620=K1*(the energy of the exhaust gas of the exhaust gas cooling unit−K2*(the exhaust gas that can be flowed into the inlet of the heat recovery steam generator based on the current temperature at the inlet of the heat recovery steam generator−the current energy at the inlet of the heat recovery steam generator)))/(the energy of the exhaust gas of the exhaust gas cooling unit).

The K1 refers to a value that is determined from the energy of water injected by the direct water-cooling type cooling unit, and the K2 refers to a value that is determined depending upon the state of the exhaust gas cooling unit. The K1 and the K2 are values between 0 and 1, for example, 1.

In an embodiment, the energy of the exhaust gas is calculated based on the angle of the valve that controls the fuel flowed into the gas turbine and the amount of air flowed into the gas turbine. The energy of the exhaust gas is calculated using the fuel flowed into the gas turbine and the amount of air flowed into the gas turbine as an input value of a specific function. The specific function is calculated based on the physics and machine learning of the gas turbine. The energy of the exhaust gas can be measured by the sensor.

In an embodiment, the energy of the exhaust gas that can be flowed into the inlet of the heat recovery steam generator based on the current temperature at the inlet of the heat recovery steam generator is calculated based on the increase amount of the air temperature of the super heater included in the heat recovery steam generator. The energy of the exhaust gas that can be flowed into the inlet of the heat recovery steam generator is calculated using the amount of increase in the air temperature of the super heater included in the heat recovery steam generator as an input value of a specific function. The specific function is calculated based on the physics and machine learning of the super heater. The energy of the exhaust gas that can be flowed into the inlet of the heat recovery steam generator based on the current temperature at the inlet of the heat recovery steam generator can be measured by the sensor.

As described above, those skilled in the art to which the present disclosure pertains will appreciate that the present disclosure can be implemented in other detailed forms without changing the technical spirit or essential characteristic of the present disclosure. Accordingly, it is to be understood that the aforementioned embodiments are only illustrative, but are not limiting or restrictive. Furthermore, the flowcharts shown in the drawings are merely sequential order illustrated to achieve the most preferred results in implementing the present disclosure, and other additional steps can be provided or some of the steps can be deleted.

Technological characteristics described in this specification and an implementation for executing the technological characteristics can be implemented using a digital electronic circuit, can be implemented using computer software, firmware or hardware including the structure described in this specification and structural equivalents thereof, or can be implemented using a combination of one or more of them. Furthermore, the implementation for executing the technological characteristics described in this specification can be implemented using a computer program product, that is, a module regarding computer program instructions encoded on a kind of program storage media in order to control the operation of a processing system or for execution by the processing system.

A computer-readable medium can be a machine-readable storage device, a machine-readable storage substrate, a memory device, a composition of materials that affect a machine-readable electromagnetic signal or a combination of one or more of them.

Meanwhile, in this specification, the terms "apparatus" or "system" cover all apparatuses, devices, and machines for processing data, for example, including a processor, a computer or a multi-processor, or a computer. The processing system can include, for example, code that forms processor firmware, a protocol stack, a database management system, an operating system, or all types of codes that form an execution environment for a computer program when a combination of one or more of them is requested, in addition to hardware.

A computer program also known as a program, software, a software application, a script or code can be written in any form of a programming language which includes a compiled or interpreted language or a transcendental and/or procedural language, and can also be implemented in any form including an independent program or module, a component, a subroutine or other units suitable for being used in a computer environment.

Meanwhile, the computer program does not need to necessarily correspond to a file of a file system, and can be stored in a single file provided to a requested program, multiple files that interact with each other (e.g., a file that stores one or more modules, a lower program or part of code), or another program or part of a file including data (e.g., one or more scripts stored in markup language document).

The computer program can be placed in a single site or distributed to a plurality of sites and can be implemented to be executed on multiple computers or one or more computers interconnected over wired/wireless communication networks.

Meanwhile, a computer-readable medium suitable for storing computer program instructions and data can include semiconductor memory devices, such as EPROM, EEPROM, and a flash memory device, for example, all types of non-volatile memory, media, and memory devices including magnetic disks, such as an internal hard disk or an external disk, magneto optical disks, CDs, and DVDs. The processor and the memory can be supplemented by a logic circuit for a special object or can be integrated into the logic circuit for a special object.

An implementation for executing the subject matter described in this specification can be implemented in an operation system including a backend component, such as a data server, a middleware component, such as an application server, a frontend component, such as a client computer having a web browser or graphic user interface capable of interacting with the implementation of the subject matter described by a user in this specification or all combinations of one or more of the backend, middleware, and frontend components. The component of the system can be accessed by any type or medium for digital data communication, such as a communication network.

Hereinafter, a more detailed embodiment capable of implementing the elements included in the system and method for providing benefits based on MO service, described in this specification, along with the aforementioned contents is described in detail.

The method in the specification can be used partially or generally through a server related to a client device or a web-based storage system or means for executing computer software, program code or instructions on one or more processors included in a server. Herein, the processor can be part of a server, a client, network infrastructure, or a computing platform, such as a mobile computing platform or fixed computing platform, and more specifically, can be a kind of computer or processing device capable of executing program instructions, code, etc. In addition, the processor can further include memory for storing the method, instructions, code or program for guiding footpath based on user movement detection, and when memory is not included in the processor, the processor can access a storage device, such as CD-ROM, DVD, memory, a hard disk, a flash drive, RAM, ROM, or a cache in which the method, instructions, code or program in accordance with the present disclosure through a separate interface.

In addition, the system and method for guiding footpath based on user movement detection, which have been described in this specification, can be used partially or generally through an apparatus for executing computer software on a server, a client, a gateway, a hub, a router or network hardware. Herein, the software can be executed in various types of servers, such as a file server, a print server, a domain server, an Internet server, an intranet server, a host server, and a distributed server, and the aforementioned servers can further include memory, a processor, a computer-readable storage medium, a storage medium, a communication device, a port, a client, and an interface capable of accessing other servers over wired/wireless networks.

In addition, the method, instructions, or code in accordance with the present disclosure can also be executed by a server, and other devices required to execute the method for guiding footpath based on user movement detection can be implemented as part of a hierarchical structure associated with the server.

In addition, the server can provide an interface to other devices including a client, another server, a printer, a database server, a print server, a file server, communication a server, and a distributed server without limitation, and a connection through the interface can enable a program to be easily executed at a remote place over wired/wireless networks.

In addition, any one of devices connected to the server through the interface can further include at least one storage device capable of storing the method, instructions or code for face-to-face OTP issuance, and the central processor of the server can provide instructions, code, etc. to be executed on another device to the device to be stored in a storage device.

Meanwhile, the method in this specification can be used partially or generally through network infrastructure. Herein, the network infrastructure can include all of devices, such as a computing device, a server, a router, a hub, a firewall, a client, a personal computer, a communication device, and a routing device, and separate modules capable of executing respective functions, and the network infrastructure can further include storage media, such as a storage flash memory, a buffer, a stack, RAM, and ROM, in addition to the aforementioned devices and module. In addition, the method, instructions or code for guiding footpath based on user movement detection can also be executed by and stored in any one of the device, module, and storage medium included in the network infrastructure, and another device required to execute the method can also be implemented as part of the network infrastructure.

In addition, the system and method that are described in this specification can be implemented using hardware or a combination of hardware and software suitable for a particular application. Herein, the hardware includes all of general-purpose computer devices, such as a personal computer and a mobile communication terminal, and a business type specific computer device, and the computer device can be implemented using a device, such as memory, a microprocessor, a microcontroller, a digital signal processor, an application-specific integrated circuit, a programmable gate array, programmable array logic or a combination of them.

The aforementioned computer software, instructions, code, etc. can be stored or accessed by a readable device, and herein, the readable device can include memory, such as a computer component including digital data used for computing for a specific time, semiconductor storage, such as RAM or ROM, permanent storage, such as an optical disk, high-capacity storage, such as a hard disk, a tape and a drum, optical storage, such as a CD or DVD, and network access type storage, such as flash memory, a floppy disk, a magnetic tape, a paper tape, an independent type RAM disk, high-capacity storage detachable from a computer, dynamic memory, static memory, variable storage, and cloud. Meanwhile, herein, the instructions, code, etc. include all of languages, such as data-oriented languages, such as SQL and dBase, system languages, such as C, Objective C, C++, and Assembly, architecture languages, such as Java and NET, and application languages, such as PHP, Ruby, Perl, and Python, but are not limited thereto, and can include all of languages widely known to those skilled in the art to which the present disclosure pertains.

In addition, the "computer-readable medium" described in this specification includes all of media which contribute to the provision of instruction to a processor in order to execute a program. More specifically, the "computer-readable medium" includes non-volatile media, such as a data storage device, an optical disk and a magnetic disk, volatile media, such as dynamic memory, and transmission media, such as a coaxial cable, a copper wire and an optical fiber for sending data, but is not limited thereto.

Meanwhile, the elements for executing the technical characteristics of the present disclosure included in the block diagrams and flowcharts shown in the accompanying drawings of this specification mean the logical boundary between the elements.

In accordance with software or hardware embodiments, however, the illustrated elements and functions thereof are executed in the form of an independent software module, a monolithic software structure, code, a service or a combination of them and are stored in a medium which is executable by a computer including a processor capable of executing stored program code and instructions to implement their functions, such that all of such embodiments should be construed as belonging to the scope of the present disclosure.

Accordingly, the accompanying drawings and technologies thereof describe the technical characteristics of the present disclosure, but should not be simply reasoned unless a specific array of software for implementing such technical characteristics is clearly described otherwise. That is, the aforementioned various embodiments can be present and can be partially modified while having the same technical characteristics as those of the present disclosure, such that such modified embodiments should be construed as belonging to the scope of the present disclosure.

In addition, the flowchart describes operations in the drawing in a specific sequence, but has been illustrated to obtain the most preferred results, and it should not be understood that such operations must be executed or all the illustrated operations must be executed in the illustrated specific sequence or sequential order. In a specific case, multi-tasking and parallel processing can be advantageous. In addition, the separation of various system components in the aforementioned embodiments should not be construed as requesting such separation in all the embodiments, and it should be understood that the aforementioned program components and systems can be integrated into a single software product or packaged into a multi-software product.

As described above, the detailed terms proposed in this specification are not intended to limit the present disclosure. Accordingly, although the present disclosure has been described in detail with reference to the aforementioned embodiments, those skilled in the art to which the present disclosure pertains can reconstruct, change and modify the embodiments without departing from the scope of the present disclosure.

The scope of the present disclosure is defined by the following appended claims rather than the detailed description, and the present disclosure should be construed as covering all modifications or variations derived from the meaning and scope of the appended claims and their equivalents.

INDUSTRIAL APPLICABILITY

Meanwhile, in connection with the industrial applicability of the present disclosure, the present disclosure relates to an exhaust gas cooling device and method, and a device and method for installing an exhaust gas cooling device on the upper end of a duct of a heat recovery steam generator to cheaply cool exhaust gas even without occupying an additional dedicated area, thus having industrial applicability.

What is claimed is:

1. An exhaust gas cooling device for a heat recovery steam generator having a duct for receiving exhaust gas from a gas turbine, the exhaust gas cooling device comprising:
   an exhaust gas cooling unit disposed at an upper end of the duct and configured to selectively receive a flow of exhaust gas from the gas turbine and to cool the received flow of exhaust gas, the exhaust gas cooling unit comprising a first door through which the exhaust gas from the gas turbine may flow into the exhaust gas cooling unit, and a second door through which the exhaust gas in the exhaust gas cooling unit may flow into an inlet of the heat recovery steam generator; and
   a control unit for controlling the exhaust gas cooling unit to lower a rate of increase in an energy of exhaust gas flowing into the heat recovery steam generator through the duct.

2. The exhaust gas cooling device of claim 1, wherein at least one of the first door and the second door includes curved upper and lower surfaces for guiding the flow of exhaust gas.

3. The exhaust gas cooling device of claim 1, wherein the control unit closes the first door and the second door when the exhaust gas flowing through the first door and the exhaust gas flowing through the second door exhibit equal energy.

4. The exhaust gas cooling device of claim 1, wherein the control unit opens the first door and the second door to a predetermined degree of opening when the gas turbine discharges exhaust gas.

5. The exhaust gas cooling device of claim 4, wherein the control unit determines the degree of opening based on a current temperature of exhaust gas at the inlet of the heat recovery steam generator and a normal-state temperature of exhaust gas at the inlet of the heat recovery steam generator.

6. The exhaust gas cooling device of claim 1, wherein the exhaust gas cooling unit comprises:
   a passage through which the exhaust gas flows;
   a direct water-cooling type cooling unit for injecting an amount of water into the passage through which the exhaust gas flows;

an indirect water-cooling type cooling unit which is provided with water and is arranged adjacent to the passage through which the exhaust gas flows; and an indirect air-cooling type cooling unit which is provided with air and is arranged adjacent to the indirect water-cooling type cooling unit.

7. The exhaust gas cooling device of claim 6, wherein the control unit adjusts the amount of injected water based on
the energy of the exhaust gas flowing into the exhaust gas cooling unit,
a maximum energy of exhaust gas flowable into an inlet of the heat recovery steam generator, based on a current temperature of the exhaust gas at the inlet, and
a current energy of the exhaust gas at the inlet.

8. The exhaust gas cooling device of claim 6, wherein the control unit adjusts the amount of injected water based on a difference between
the energy of the exhaust gas flowing into the exhaust gas cooling unit, and
a maximum energy of exhaust gas flowable into an inlet of the heat recovery steam generator, based on a current temperature of the exhaust gas at the inlet.

9. The exhaust gas cooling device of claim 8, wherein the energy of the exhaust gas is calculated based on a status of a valve for controlling fuel provided to the gas turbine and the amount of water injected by the direct water-cooling type cooling unit.

10. An exhaust gas cooling method using an exhaust gas cooling unit disposed at an upper end of a duct of a heat recovery steam generator receiving exhaust gas from a gas turbine, the exhaust gas cooling method comprising:
selectively receiving in the exhaust gas cooling unit a flow of exhaust gas from the gas turbine;
cooling the received flow of exhaust gas;
controlling the exhaust gas cooling unit to lower a rate of increase in an energy of exhaust gas flowing into the heat recovery steam generator through the duct;
controlling a first door through which the exhaust gas from the gas turbine may flow into the exhaust gas cooling unit; and
controlling a second door through which the exhaust gas in the exhaust gas cooling unit may flow into an inlet of the heat recovery steam generator.

11. The exhaust gas cooling method of claim 10, further comprising:
closing the first door and the second door when the exhaust gas flowing through the first door and the exhaust gas flowing through the second door exhibit equal energy.

12. The exhaust gas cooling method of claim 10, further comprising:
opening the first door and the second door to a predetermined degree of opening when the gas turbine discharges exhaust gas.

13. The exhaust gas cooling method of claim 12, further comprising:
determining the degree of opening based on a current temperature of exhaust gas at the inlet of the heat recovery steam generator and a normal-state temperature of exhaust gas at the inlet of the heat recovery steam generator.

14. The exhaust gas cooling method of claim 10, wherein the exhaust gas cooling unit comprises a passage through which the exhaust gas flows, and wherein the cooling the received flow of exhaust gas comprises:
injecting an amount of water into the passage through which the exhaust gas flows;
providing water to an indirect water-cooling type cooling unit arranged adjacent to the passage through which the exhaust gas flows; and
providing air to an indirect air-cooling type cooling unit arranged adjacent to the indirect water-cooling type cooling unit.

15. The exhaust gas cooling method of claim 14, further comprising:
adjusting the amount of injected water based on
the energy of the exhaust gas flowing into the exhaust gas cooling unit,
a maximum energy of exhaust gas flowable into an inlet of the heat recovery steam generator, based on a current temperature of the exhaust gas at the inlet, and
a current energy of the exhaust gas at the inlet.

16. The exhaust gas cooling method of claim 14, further comprising:
adjusting the amount of injected water based on a difference between
the energy of the exhaust gas flowing into the exhaust gas cooling unit, and
a maximum energy of exhaust gas flowable into an inlet of the heat recovery steam generator, based on a current temperature of the exhaust gas at the inlet.

17. The exhaust gas cooling method of claim 16, wherein the energy of the exhaust gas is calculated based on a status of a valve for controlling fuel provided to the gas turbine and the amount of water injected by the direct water-cooling type cooling unit.

18. The exhaust gas cooling method of claim 16, wherein the maximum energy is calculated based on an amount of increase in an air temperature by a super heater included in the heat recovery steam generator.

19. An exhaust gas cooling device for a heat recovery steam generator having a duct for receiving exhaust gas from a gas turbine, the exhaust gas cooling device comprising:
an exhaust gas cooling unit disposed at an upper end of the duct and configured to selectively receive a flow of exhaust gas from the gas turbine and to cool the received flow of exhaust gas; and
a control unit for controlling the exhaust gas cooling unit to lower a rate of increase in an energy of exhaust gas flowing into the heat recovery steam generator through the duct,
wherein the exhaust gas cooling unit comprises:
a passage through which the exhaust gas flows;
a direct water-cooling type cooling unit for injecting an amount of water into the passage through which the exhaust gas flows;
an indirect water-cooling type cooling unit which is provided with water and is arranged adjacent to the passage through which the exhaust gas flows; and
an indirect air-cooling type cooling unit which is provided with air and is arranged adjacent to the indirect water-cooling type cooling unit.

20. The exhaust gas cooling device of claim 19, wherein the control unit adjusts the amount of injected water based on a difference between
the energy of the exhaust gas flowing into the exhaust gas cooling unit, and
a maximum energy of exhaust gas flowable into an inlet of the heat recovery steam generator, based on a current temperature of the exhaust gas at the inlet.

* * * * *